Sept. 18, 1956        F. KRIENEN        2,763,782
PULSE REPEATER FOR RADIO LOCATION SYSTEMS
Filed Jan. 9, 1952
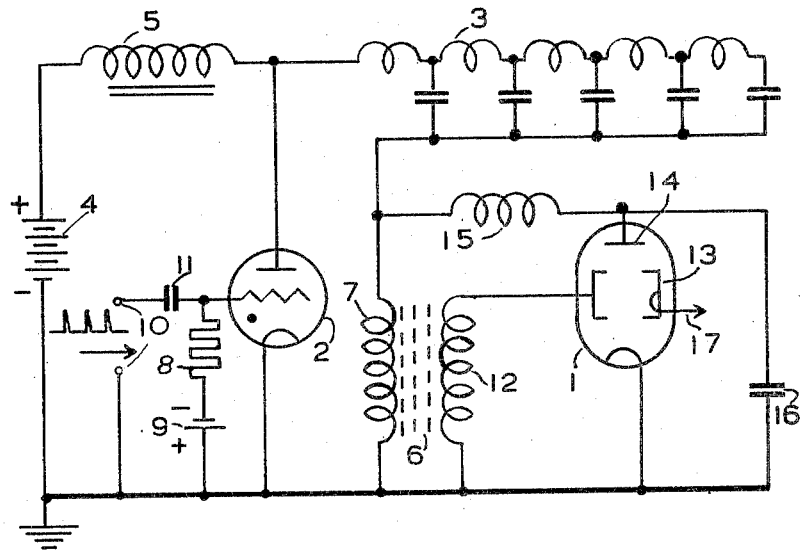
INVENTOR
Frank Krienen
By
AGENT

2,763,782
PULSE REPEATER FOR RADIO LOCATION SYSTEMS

Frank Krienen, Amsterdam, Netherlands, assignor to Hartford National Bank and Trust Company, Hartford, Conn., as trustee Application January 9, 1952, Serial No. 265,659

Claims priority, application Netherlands January 22, 1951

3 Claims. (Cl. 250—36)

This invention relates to pulse repeaters for radio location systems.

In radar systems for beaconing and/or piloting purposes, for example, harbour-radar or aerodrome-radar systems, difficulties are usually experienced in interpreting the radar image. In a harbour system, for example, it is difficult to determine, particularly when the harbour comprises busy waterways, which of the many spots in the panoramic image of the harbour represents a definite reference point or a vessel to be piloted. Once these difficulties are surmounted and a given craft is provided with navigation instructions by the observer of the radar image, it may happen that the observer, after having been diverted or where the vessel to be piloted passes another vessel at a small distance, is in need of reidentification.

With the use of aerodrome-radar and air-defence radar systems analogous difficulties occur and, moreover, simple means are required for distinguishing our aircraft from enemy aircraft.

In order to fulfil these requirements various pulse repeaters have been proposed, but these are comparatively complicated, heavy and not too well suited for battery supply, since the requisite input power is comparatively high.

The present invention provides a particularly suitable pulse repeater for the aforesaid purposes, which has a minimum of component parts. A pulse repeater in accordance with the invention may be very small and lightweight and, for the use referred to, combines sufficient output power over a wide frequency range with minimum current consumption, so that a battery supply for the repeater is feasible. Moreover, the arrangement of the repeater at unmanned points of identification and the equipment of a pilot with this repeater for use on board a craft to be piloted or the like does not entail serious difficulties.

The pulse-repeater according to the invention comprises a pulse-producer, controlled by incoming pulses, and a reflex-klystron oscillator, the supply voltages for the reflex-electrode and the klystron anode being taken from the pulse producer by supplying its output pulses with opposite polarities to the reflex-electrode circuit and the klystron anode circuit.

The output circuit of the pulse generator preferably comprises a primary winding, included in the reflex-electrode circuit, of a transformer whose secondary is connected between the anode and the cathode of the klystron tube.

In order to increase the supply voltage set up at the reflex-electrode or to produce a plurality of klystron pulses during the occurrence of a single pulse of the pulse producer, it is advantageous to connect the reflex-electrode to the primary transformer winding through a network producing supply voltage pulses. In its simplest form this pulse-producing network may consist of a series-resonance circuit having an appropriate tuning frequency and being connected in parallel with the primary transformer winding, the reflex-electrode being connected to a tapping thereof.

In order to minimize the current consumption, the pulse producer preferably comprises an artificial line serving as a pulse producing network, which line is connected to a source of direct current on the one hand through a coil producing a resonance charge and on the other hand through the output impedance of the pulse producer, while a normally cut-off grid-controlled gas-discharge tube, to the control-grid of which the incoming pulses are supplied as ignition pulses, is connected in parallel with the series-connection of the artificial line and the output impedance.

The invention and its advantages will be described more fully with reference to the accompanying drawing, given by way of example, which represents the circuit diagram of a particularly suitable embodiment thereof.

The pulse repeater represented comprises an oscillator including a reflex-klystron 1 and a pulse producer with a gas-filled grid-controlled discharge tube 2. The pulse producer is of a type known per se and comprises an artificial line 3 consisting of several sections, which line is periodically charged during operation of the repeater to a voltage of, say, 200 to 300 v. by a direct current source 4 having a terminal voltage of, say, 110 to 160 v., through a choke 5 effecting a resonance charge. One end of the artificial line 3 is connected to the grounded junction terminal of the source of direct current 4 by way of the primary winding 7 of an output transformer 6 having a high-frequency iron core. In parallel with the series-connection of the artificial line 3 and the output transformer 6 is connected the gas discharge tube 2 which is normally cut off by means of a negative grid bias from a supply 9, which bias is applied to the control grid by way of a grid-resistor 8. By way of input terminals 10 of the circuit-arrangement and a coupling capacitor 11 ignition pulses are supplied to the control grid of the gas-discharge tube, which pulses are taken from an appropriate receiver (not shown).

Each time an ignition pulse is supplied to the control grid of tube 2, the series-connection of the artificial line 3 and the output transformer 6 is substantially short-circuited with the result that the artificial line 3 discharges through the grid-discharge tube 2 and the primary winding 7 of output transformer 6. At the primary 7 there is then set up a voltage pulse, for example, of 100 v. of negative polarity and having a duration of, say, 6 microseconds which is determined by the electrical length of the artificial line.

The oscillator comprising the reflex-klystron tube 1 is energized by the pulses supplied to the transformer 6. This transformer preferably has a considerable transformation ratio, for example, 1:3, so that a positive voltage pulse of a comparatively high peak voltage, for example of 300 v., is set up at the klystron anode 13 connected to the secondary 12 of the transformer.

The negative pulses supplied to the transformer 6 are also supplied to the reflex-electrode 14 of the klystron tube. To this end a series-resonance circuit comprising a coil 15 and a capacitor 16 is connected in parallel with the primary transformer winding 7, the tuning frequency of this circuit being, for example 1 to 3 mc./sec. As a result thereof a plurality of negative supply voltage pulses appear at the reflex-electrode 14, connected to the junction point of coil 15 and capacitor 16, during a pulse of negative polarity produced by the artificial line, the peak voltage of the said negative supply voltage pulses materially exceeding that of the pulses supplied by the artificial line and being, for example, 160–200 v. The supply voltage pulses having a duration of, say, approximately 1 microsecond appearing at the reflex-electrode are sine shaped with the result that the klystrom tube successively oscillates in different frequencies. This is desirable, since the radar receivers cooperating with the pulse repeater may not be accurately tuned. Hence, the klystron oscillator commands a frequency range of approximately 30 mc./sec. with an average transmitting wavelength of approximately 3 cms. at the aforesaid voltage values.

It is emphasized that the klystron anode circuit and the reflex electrode circuit do not include sources of direct voltage, but the required supply voltages are taken solely from the pulse producer.

In the embodiment represented, a train of supply voltage pulses appear at the reflex-electrode in response to exciter pulse of the pulse producer, the number of said supply voltage pulses depending upon the tuning frequency of the series-circuit 15, 16. Each supply voltage pulse produces in the klystron oscillator a carrier-wave pulse in which may be supplied to an omni-directional aerial by way of a single turn search coil connected to the output lead 17. The number of carrier-wave pulses occurring per exciter pulse may be used to characterize the pulse repeater. With the use of a series-resonance circuit as shown in the drawing, the carrier-wave pulses produced are substantially equidistant. It is evident that the use of more complicated resonance networks or artificial lines permits mutually non-equidistant carrier-wave pulses to be transmitted as a code characteristic of the pulse repeater.

If, for example, the ignition pulses supplied to the discharge tube 2 have a repeater frequency of 5000 cycles per second and the pulse producer emits pulses of 6 microseconds, the current consumption of the pulse producer described is approximately 0.1 watt with a peak power of several watts of the emitted pulses. Since the klystron tube is intermittently loaded only for a short time, considerable overloads relative to the cathode-emission are permissible so that the consumption of filament current is comparatively small. For the gas discharge tube 2 similar considerations hold, so that the overall current consumption of the pulse repeater is small and in practice battery supply is feasible.

What I claim is:

1. Apparatus for repeating incoming pulses, comprising a pulse producer responsive to each incoming pulse to develop a voltage pulse, said pulse producer including an output circuit constituted by a transformer having a primary and a secondary, an oscillator including a klystron having a cathode, an anode and a reflex electrode, means coupling said secondary to said anode, and means including a pulse producing network connected to couple said primary to said reflex electrode, whereby voltage pulses of opposing polarity are applied to said anode and to said reflex electrode so as to actuate said oscillator during the occurrence of said voltage pulse.

2. Apparatus, as set forth in claim 1, wherein said network is constituted by a series resonance circuit connected across said primary, said reflex electrode being connected to a tap in said series resonance circuit.

3. Apparatus, as set forth in claim 2, wherein said series resonance network is tuned to a predetermined frequency and wherein said pulse producer yields a voltage pulse whose duration extends over several periods of said predetermined frequency.

References Cited in the file of this patent

UNITED STATES PATENTS

| 2,469,977 | Morrison | May 10, 1949 |
| 2,494,568 | Lundy | Jan. 17, 1950 |
| 2,659,007 | Halpin | Nov. 10, 1953 |

FOREIGN PATENTS

| 574,967 | Great Britain | Jan. 29, 1946 |